United States Patent
Mathews et al.

[11] 3,870,999
[45] Mar. 11, 1975

[54] COMMUNICATIONS VIA LORAN NAVIGATION PULSES

[75] Inventors: Carl S. Mathews, Annandale; Arnold Swagerty, Vienna, both of Va.

[73] Assignee: A-T-O Inc., Willoughby, Ohio

[22] Filed: June 29, 1973

[21] Appl. No.: 375,234

[52] U.S. Cl. ............................................... 343/103
[51] Int. Cl. ............................................... G01s 1/24
[58] Field of Search ........................ 343/103, 105 R

[56] References Cited
UNITED STATES PATENTS
3,263,231  7/1966  Smith et al. ........................ 343/103
3,321,760  5/1967  Lipsey ................................ 343/103

Primary Examiner—Maynard R. Wilbur
Assistant Examiner—G. E. Montone
Attorney, Agent, or Firm—Sughrue, Rothwell, Mion, Zinn & Macpeak

[57] ABSTRACT

In a Loran-C navigation system additional information is communicated from transmitter to receiver by modulating a portion of the Loran pulse. The portion modulated is the end portion and starts at a point on the pulse which is subsequent to the navigation sampling point. Consequently, the modulation has no effect on that portion of the Loran pulse which is presently used by navigation receivers to provide accurate timing for the purpose of ascertaining navigation information. The modulation is carried out by phase modulating the tail end of the pulse in accordance with desired information. Multiple channels of information per pulse may be modulated onto each pulse. The transmitted pulse is a composite pulse which is effectively a combination of a navigation pulse and a communications pulse - the latter being phase modulated. In the receiver, the navigation pulse component is substantially nulled at a sampling cycle point which occurs some time after the point of the composite which is used for navigation purposes. Phase tracking means and information read out means are provided for tracking a reference phase and for providing direct read out of the channel information modulated in each pulse.

26 Claims, 12 Drawing Figures

COMMUNICATIONS VIA LORAN NAVIGATION PULSES

BACKGROUND OF THE INVENTION

The invention is in the field of Loran systems. Specifically, the invention is a system and method for communicating information via Loran pulses, particularly Loran-C pulses Loran-C navigation systems are well known in the art. Furthermore, it is also known that communications information can be modulated onto Loran-C pulses. The latter is in a system presently in use today. Before reciting further information about the present systems used to modulate information onto Loran-C pulses, some basic facts and background about Loran-C will be given.

Loran systems are in fairly widespread use throughout portions of the world. Basically, Loran systems are pulsed hyperbolic navigation systems. Loran transmitters positioned at fixed locations transmit pulses at known repetition intervals. A Loran receiver on a vehicle, such as a ship, measures the time difference of arrival of the pulses from a pair of stations; the time difference of arrival determining a hyperbolic line of position on which the receiver is located. The measure of the time difference of arrival of signals from a second pair of stations (one station is typically common to both pairs) enables the vehicle to determine a second hyperbolic line of position. The intersection of the two hyperbolic lines of position determines the accurate position of the receiver. As is well known in the art, standard charts for all types of Loran systems are available, and once having the time difference information obtained from the Loran receiver, the position of the vehicle is determined by referring to the charts.

A particular type of Loran which is in widespread use is known as Loran-C. A Loran-C transmitting triad includes a master transmitting station and two slave transmitting stations which are synchronized to the master station. The stations operate at 100 KHz carrier frequency and at one of the 48 standard Loran repetition intervals.

Each transmitter transmits a group of eight pulses spaced 1,000 microseconds apart. The master station group also includes a ninth pulse which is separated from the eight pulse by 2,000 usec. The purpose of sending out the ninth pulse from the master station is to identify that station. Each station send out its respective group of pulses once each repetition interval and the slave stations are synchronized to the master station and timed so that they send out their respective groups at fixed times following the transmission of the group from the master station. The time separations are fixed so that none of the groups will overlap in the receiver provided the receiver is within the geographic area served by the Loran transmitters.

Figure 1:
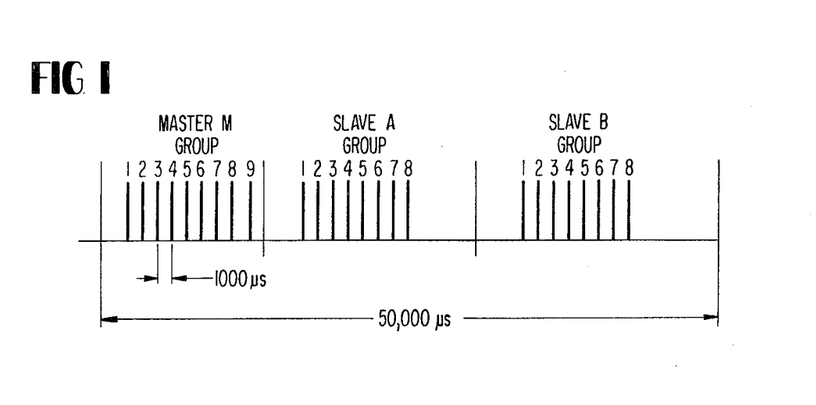
FIG. 1 is a time graph illustrating the relationship of groups of Loran-C pulses from a Loran transmitting triad.
Figure 2:
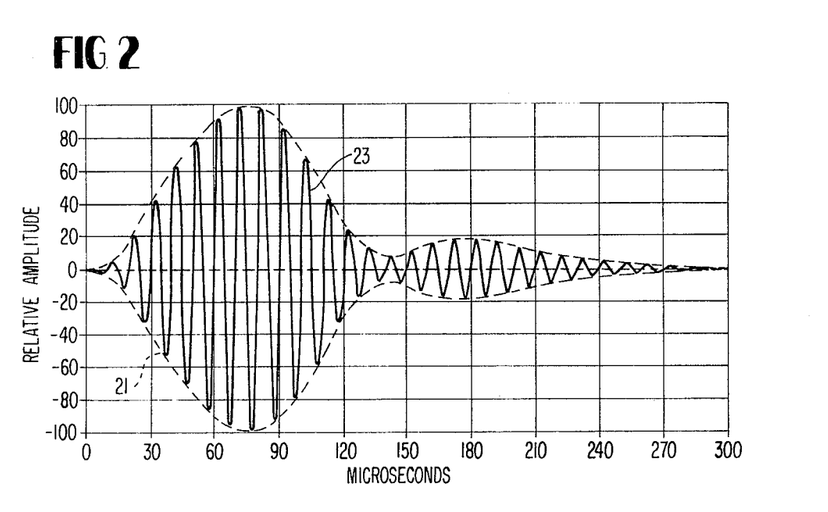
FIG. 2 is a time graph illustrating a typical Loran-C pulse.

The relationship between the groups of pulses from a master station M and two slave stations A and B is illustrated in FIG. 1, and a typical Loran-C pulse is illustrated in FIG. 2. The pulse envelope is shown by dashed line 21 and the carrier by continuous line 23.

An important feature of a Loran-C navigation receiver is its ability to provide precise time difference measurements. An error of measurement as low as 10 usec (a single wavelength of 100 KHz carrier) can result in an error of several miles in determining the location of the receiver. Loran-C receivers operate to locally generate precise timing pulses which are keyed to specific points on the received Loran pulses. One precise timing pulse is keyed to the received master pulses, a second precise timing pulse is keyed to the slave A received pulses and a third precise timing pulse is keyed to the slave B received pulses. A requirement for precise measurement is that the timing pulses for each of the three groups be accurately controlled and timed to coincide with identical points on the received pulses from the three transmitters. For example, if the precise timing pulse which is locked to the received master pulses is timed to occur at the 30 usec point of a received master pulse, accurate measurement requires that the timing pulse for the slave group be in coincidence with the 30 usec point of the slave pulses.

The respective timing pulses (hereinafter sometimes referred to as ST3), along with other sample pulses, are generated by three phaselocked loops which are, respectively, locked in phase to the 100 KHz received carriers of the master, slave A and slave B stations.

As previously pointed out it is known in the art to "ride" additional information on the Loran pulses. This is accomplished by a phase modulation technique. One such Loran communications system is known as the Clarinet Pilgrim system and is described in technical journals. Basically, in present Loran communications systems the entire Loran pulse is phase modulated according to the bit information to be carried by the pulse. Such systems are not free of problems. Basically, the prior systems interfere with the primary feature and purpose of Loran — the navigation information feature. Reference is made to the publication, "Loran-C Phase Modulation Study," Final Technical Report, Volumn I, Contract No. DOT-CG–00632–A, prepared by Avionics Division ITT for U.S. Coast Guard Headquarters, for a detailed exposition of the problems of present Loran-C Communications systems. The first sentence of the abstract of that voluminous report is revealing and is quoted here:

"Phase modulation of the Loran-C pulse affects the performance of the navigation function in several ways."

SUMMARY OF THE INVENTION

In accordance with the present invention communications information is modulated onto Loran pulses without having the adverse affects on the navigation function experienced in prior Loran communications systems. Furthermore, the system of the present invention is not limited to the transmission of one bit of communication per Loran pulse, but by means of a polyphase modulation technique and a simplified detecting scheme, multiple bits of communication information may be modulated onto each Loran Pulse. The invention is carried out by phase modulating only a portion of the Loran pulse. The portion modulated excludes that portion which conventional Loran navigation receivers use for precise navigation measurements. The portion modulated is polyphase modulated in dependence upon the input bit information.

DETAILED DESCRIPTION OF THE PREFERRED EMBODIMENTS

Before describing apparatus for carrying out the invention, the principles of operation of the invention will be described with reference to several waveform and phasor diagrams. The invention will be described specifically in connection with Loran-C navigation although it will be apparent that the invention can be practiced with other types of navigation pulses.

As mentioned above, FIG. 2 illustrates a typical Loran-C pulse waveform. The carrier frequency is shown by 23 and is 100 KHz (10 usec period) and the envelope is shown by 21. In a conventional Loran-C navigation receiver each received pulse results in the generation of a narrow (2.5 usec) sample trigger pulse which is phase locked to the received 100 KHz carrier and timed to occur at exactly the 30 usec point of the received pulse. The trigger pulses are used to obtain the precise time difference measurements needed to provide the navigation information. It should be noted that a Loran-C pulse is not "modulated" with navigation information; the time of arrival of the pulse relative to the time of arrival of a similar pulse from another transmitter conveys navigation information.

In discussing the Loran-C system one may say that the navigation information is carried at the 30 usec point or third cycle of each pulse, since the trigger pulse which is subsequently used to obtain the navigation information is locked at the 30 usec point. In accordance with the present invention "other information" is modulated onto the Loran-C pulses in a manner which does not affect the navigation information. The other information may be any information which can be represented by electrical signals. The binary notations 1 and 0 will be used herein to designate the value of one bit or item of other information. Furthermore, in accordance with the invention, multiple channels or bits or items may be modulated onto a Loran-C navigation pulse without affecting the navigation information.

Broadly, the information to be carried by the pulse operates to alter a parameter of the pulse starting at a time-point in said pulse subsequent to the time-point of the pulse which conveys the navigation information. Specifically, the latter portion of the pulse, beginning some time after the 30 usec point, is phase modulated by the information.

Although the particular method used to modulate the tail portion of the pulse is not critical, a preferred method is to form a communications pulse and add it to the navigation pulse. The sum will be a composite pulse having modulation from the fourth cycle to the end. The communications pulse may be formed by delaying the navigation pulse by 40 usec. The information then modulates the communications pulse by phase shifting the same.

As stated above, the invention is capable of providing multiple communications channels or bits or items of information per Loran-C pulse. Assuming only one channel per pulse, (one bit having 0 or 1 value) the communications pulse may be phase shifted +90° or −90°, depending on the value of the channel information. The two phase shifts are referred to herein as phasors. The relationship between the number of phasors and the number of channels is given in the table below. The angle separation and time separation between adjacent phasors is given for the 100 KHz Loran-C carrier frequency.

| Channels | Phasors | Angle Separation | Time Separation |
|---|---|---|---|
| 1 | 2 | 180° | 5 usec |
| 2 | 4 | 90° | 2.5 usec |
| 3 | 8 | 45° | 1.25 usec |
| n | $2^n$ | $360°/2^n$ | $10\ usec/2^n$ |

Figure 3:
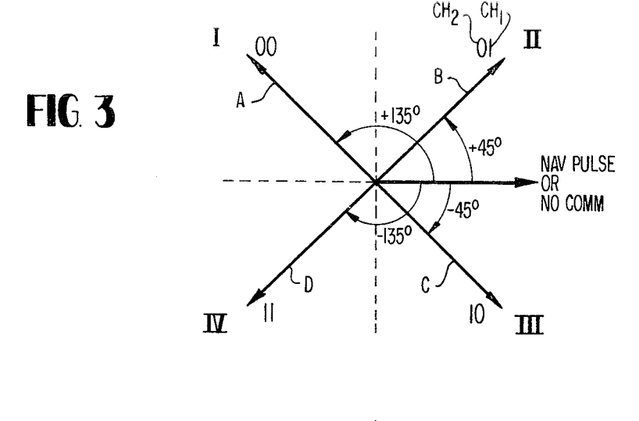
FIG. 3 is a phasor diagram illustrating the multiphase modulation technique of the present invention.

A phasor diagram for the two channel case is shown in FIG. 3. Since the communications pulse is derived from the navigation pulse, the four phases of the communications pulse are shown relative to the phase of the navigation pulse. The latter pulse is illustrated by the phasor labelled NAV PULSE. This phasor will also sometimes be referred to as the NO COMM phasor since it represents the phase of the communication pulse when no channel information modulation is applied. Since each channel item or bit can have one of two values (0 or 1) the combination of channel 1 and channel 2 has four possible values; 00, 01, 10, 11. In the drawing, the bit on the right of each two-bit symbol designates channel 1; the other designates channel 2.

It can be seen that the phasors are spread evenly about the 360° of the cycle. The purpose of this is to provide maximum modulation index (maximum separation between adjacent phasors) to thereby simplify the task of the detector circuitry which must detect which of the phasors is being received. It will also be noted that the relationship between the phasors and the information is set so that the phasors correspond to a binary counter (in successive values) starting with the maximum positive shift phasor and ending with the maximum negative shift phasor. This can be understood by referring to FIG. 3 and noting that the order of the phasors from maximum positive phase shift (+135°) to maximum negative phase shift (−135°) is, A-B-C-D. The information values for the phasors are:

| | |
|---|---|
| A | 00 |
| B | 01 |
| C | 10 |
| D | 11. |

As another example, consider a three channel system. There will be $2^3 = 8$ phasors having 45° separation. The relation between information content and phasors is set as follows:

| | |
|---|---|
| A | 000 |
| B | 001 |
| C | 010 |
| D | 011 |
| E | 100 |
| F | 101 |
| G | 110 |
| H | 111. |

The purpose of setting the phasor-information content in the above manner is to provide a simple method of reading out the information content in a receiver which is adapted to detect said information. This will be explained in more detail hereafter in connection with the description of the receiver embodiment.

Getting back to the four-phasor case of FIG. 3, the communications pulse, which is delayed 40 usec with respect to the navigation pulse and then phase shifted in dependence upon the information content, is now added to the navigation pulse. The resulting composite pulse contains no information modulation for the first four cycles, but contains information modulation from the fourth cycle on. It will thus be apparent that standard Loran-C navigation receivers can be operated in thier normal manner to obtain the "navigation information" from the pulses received from several stations. Since the latter receivers effectively use only the third cycle of each received pulse, and since the third cycle is not affected by the addition of other information the Loran-C navigation receivers are not affected by the phase modulation of the pulse.

However, a receiver adapted to receive the additional information, hereinafter referred to as a communications receiver, must operate on the portion of the pulse which is modulated. Broadly speaking, the communications receiver operates in many respects similarly to the navigation receiver, except that the communications receiver "samples" the received pulse at some cycle subsequent to the start of modulation of the pulse. For the purpose of setting forth a specific example, the "sample" point of the communications receiver is set at the sixth cycle (60 usec point) of each received pulse. The received pulse is "sampled" at the sixth cycle and the phase modulation is detected by effectively comparing the phase of the sampled pulse with the NO COMM reference phase.

Since the received pulse is a composite of the navigation and communications pulses, and since the phasors in FIG. 3 represent the phase shifts imparted to the communications pulses, it will be apparent that the phasors of the composite pulse are not identical to FIG. 3. The addition of the navigation pulse to the communications pulse results in a shifting of the phasors as shown by FIG. 4.

Figure 4:
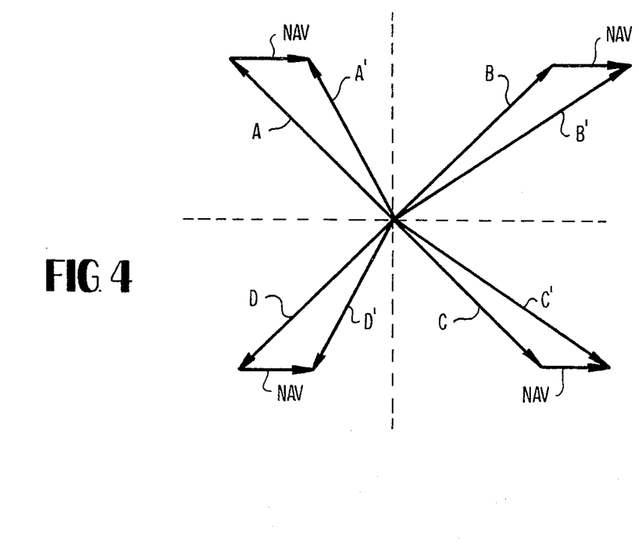
FIG. 4 is a phasor diagram illustrating the effect of combining a phase modulated communications pulse with an unmodulated navigation pulse.

In FIG. 4, phasors A, B, C and D represents the four respective phasors of the two-channel modulated communications pulse. They are the same as illustrated in FIG. 3. The NAV phasors represent the phase of the navigation pulse. Simple phasor addition results in the composite pulse having phasors A', B', C' and D' representing, respectively, the information values 00, 01, 10, 11. As will be appreciated, the composite pulse has a lower modulation index than the communications pulse. In the latter the minimum phasor separation is 90° (for the two-channel case), whereas, in the former the minimum separation is less than 90°. Note that B' and C' do not have the same separation (modulation index) as B and C.

Although the reduced modulation index does not present an intolerable situation, since there is enough noise from other sources, the avoidance of any additional modulation noise would be a benefit. In the receiver of the present invention means are includes for effectively removing the navigation pulse from the composite pulse at the sixth cycle. This is accomplished by using a notch filter. To understand the effect achieved by the notch filter reference is made to FIG. 5 which shows the navigation pulse and the communications pulse as being separate pulses. They are not in fact separated pulses, but as is well known according to Fourier analysis, one may carry out any analysis on a composite signal by analyzing the effect a circuit has on the component waveforms. The notch filter effectively notches each of the component pulses at some point, 60 to 100 usec into the pulse, causing the pulse envelopes to appear as in FIG. 6. Thus, at the 60 usec point the composite pulse is substantially the same as the communications pulse alone, since the navigation pulse has been nulled at that point.

With the above waveform and phasor diagrams kept in mind, embodiments of the apparatus for transmitting and receiving the modulated Loran-C will now be described.

There are presently many different types of Loran-C transmitter models, all operating to transmit pulses as shown in FIG. 2. Examples of Loran-C transmitters are the FPN-39, FPN-42 and the FPN-44/45. Additionally, solid state transmitters, presently used only for Loran-D, can be used for Loran-C. Details of each of these transmitters may be found in the Coast Guard Technical Manuals for the particular system. Since the latter transmitters are well known it would serve no purpose to include herein a lengthy description of their operation. Instead, only so much of the standard Loran-C transmitter operation will be described which is necessary to understand the modification which provides the phase modulation of the pulse.

In the FPN-39 and 42 each pulse is formed as follows. At the pulse transmit time, a block of 100 KHz lasting about 40 to 80 usec is gated through to the transmitter circuitry. The transmitter circuitry is nonlinear and forms the block of 100 KHz into the pulse envelope shown in FIG. 2. The latter system is shown generally in FIG. 7 as comprising the means 70 which emits a block of 100 KHz and the transmitter circuitry 72. The additional means shown, 74 and 76, are added to accomplish the modulation. The block of 100 KHz is applied to one input of a summation means 76 and to the signal input of delay and modulation means 74. The output of means 74 is applied to summation means 76 whose output, in turn, is applied to the transmitter circuitry. The means 74 operates to delay the input signal block by 40 usec and phase shift the input signal block an amount dependent upon the information content of the channel 1 and channel 2 control inputs. In the specific example being described, the phase shifts are +135°, +45°, −45° and −135°. The means 74 may take many forms as will be apparent to anyone of ordinary skill in the art. It may comprise a separate 40 usec delay means plus a phase modulator. Also, since phase modulation may be carried out in the time domain, the means 74 may comprise a separate multi-tapped delay line plus an output selector such as is illustrated in FIG. 8.

Figure 7:
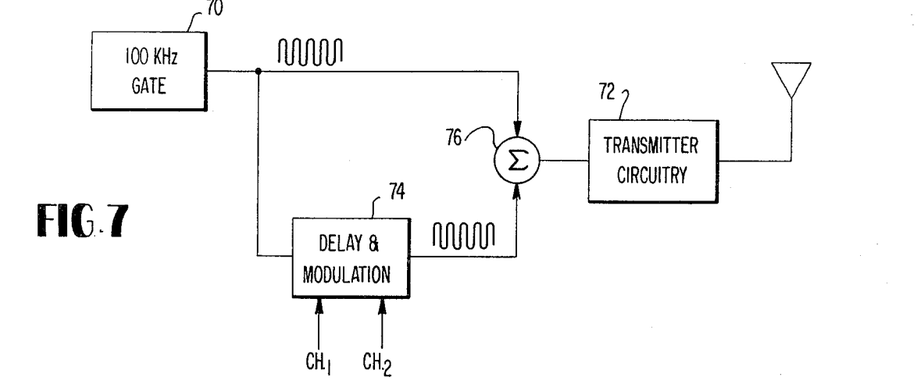
FIG. 7 is a block diagram of a modification of a conventional Loran transmitter.

The apparatus is only one example of apparatus which is capable of carrying out the functions of means 74 of FIG. 7. The apparatus comprises tapped delay line 82 and decoder/selector comprising gates 86 and 88. The summation means 76 represents summation means 76 of FIG. 7. For the two channel example these are five taps on the delay line at times 36.25 usec, 38.75 usec, 40 usec, 41.25 usec and 43.75 usec. As will be apparent, for a 100 KHz input signal at input terminal 80, a 40 usec delay results in the signal being delayed but not phase shifted. A delay of 36.25 usec corresponds to a 40 usec delay plus a +135° phase shift. A 38.75 usec delay corresponds to a 40 usec delay plus a +45° phase shift. A 41.25 usec delay corresponds to a 40 usec delay plus a −45° phase shift. A 43.75 usec delay corresponds to a 40 usec delay plus a −135° phase shift. Consequently, the desired delay and phase shift is obtained by selecting one of the output taps in accordance with the state of channel input information. The logic of gates 88 and 86 is self-explanatory. As one example, assume the input channel information is 01. Gate 88c will be energized to energize gate 86d thereby passing the 100 KHz block to the summation means after a delay of 38.75 usec. As pointed out above the latter delay corresponds to 100 KHz phase shifted +45° with respect to the input. The output of gate 86d corresponds to phasor B of FIG. 3. The relation between the other outputs and the phasors of FIG. 3 are indicated by the letters A, B, C, and D and the NO COMM output.

Figure 8:
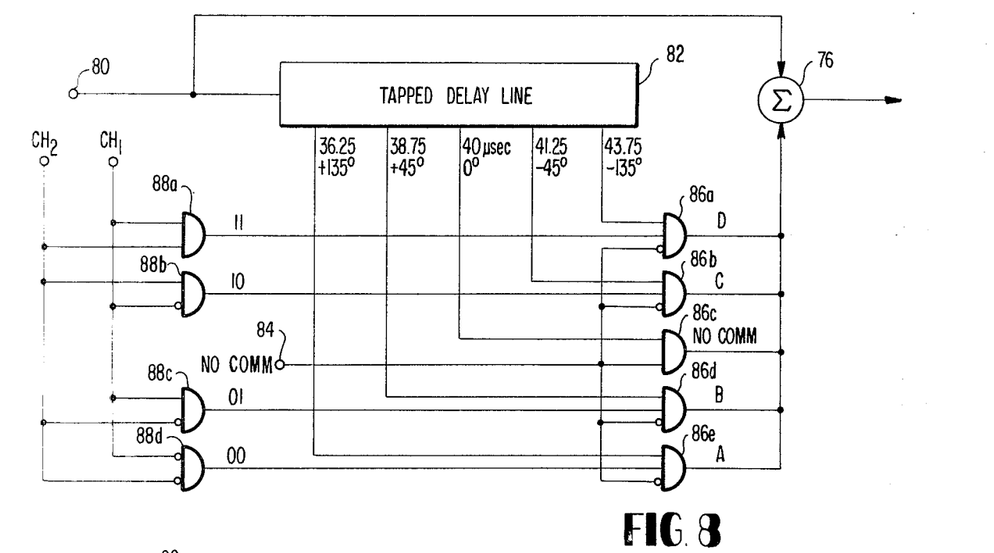
FIG. 8 is a logic diagram of a delay and modulation means for use in accomplishing the information modulation according to the present invention.

It will be noted that a NO COMM input appears at terminal 84 in FIG. 8. The latter input serves the purpose of blocking the modulation of channel information onto the pulse. The NO COMM input blocks gates 86a, 86b, 86d and 86e, and energizes gate 86c to pass the 100 KHz delayed 40 usec to the summation means. In the latter case there is a 0° phase difference between the two inputs which are applied to the summation means 76.

It is conventional in present day usage of Loran-C for communications purposes to modulate only some of the pulses in each pulse repetition group. The NO COMM input is used for those pulses which are not intended to be modulated.

Figure 9:
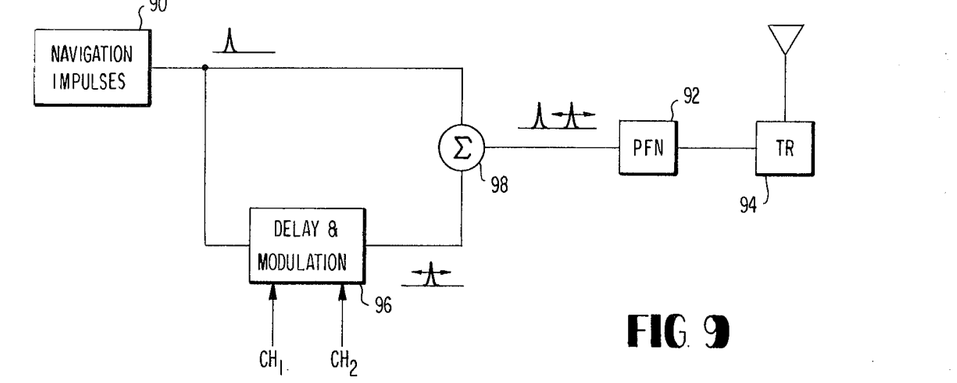
FIG. 9 is a block diagram of a modification of a second type of conventional Loran transmitter.

The FPN-44/45 model operates differently from the FPN-39 and 42. In the former, a sharp impulse is generated at each pulse transmit time. Each impulse triggers a pulse forming network which thereby forms the pulse shown in FIG. 2. The pulse thus formed is applied to a linear transmitter circuitry and is transmitted. The basic system is illustrated in FIG. 9 and comprises means 90 for generating the navigation impulses, means 92 for forming the pulses of FIG. 2, and linear transmitter circuitry 94. The FPN-44/45 system is modified by the addition of means 96 and 98 to accomplish the modulation of the pulses. In this case, the delay and modulation means operates to delay the input impulse an amount 40 ± p usec, where p is an amount of time corresponding to the desired phase shift. The summation means 98 may be a simple OR circuit in the case of the FPN-44/45 since no summation of coincident waveforms takes place in the means 98. The PFN-92 receives both impulses separated by 40 ± p usec and provides the composite output pulse heretofore described. The composite is the same as if the undelayed and delayed pulses were applied to separate but identical PFN circuits with their outputs being summed. Thus, even though there is no point in the transmitter where the navigation pulse is actually separate from the communications pulse, it is accurate to speak of the output composite pulse as a combination of the two component pulses. The circuit previously described in FIG. 8 represents one embodiment of the delay and modulation means 96 of FIG. 9.

The solid state transmitter mentioned above, differs from those described in connection with FIGS. 7 and 9 in that a computer controls the cycle-by-cycle cross over and the cycle amplitude of the Loran pulse. However, it will be apparent in view of that which is taught herein that the Loran pulse may be modulated by phase modulating the pulse from a point subsequent to the navigation sampling point irrespective of the type of Loran transmitter used.

As illustrated above, the Loran pulse is modulated after the 30 usec point using frequency domain modulation (FIG. 7) or time domain modulation (FIG. 9), both of which result in phase modulation of the Loran pulse. Another technique for achieving the same phase modulation as achieved by the above-described apparatus would be to vary the transfer function in dependence upon the channel information. This could be accomplished by the relatively simple expedient of varying the transfer function of the transmitter tuning coil and antenna elements after the 30 usec point of the pulse has passed.

It will be appreciated that not only is the phase of the pulse modulated, but the envelope of the pulse varies in dependence on the phase modulation. Thus, the envelope of the transmitted Loran-C composite pulse will differ from that shown in FIG. 2.

Figure 10:
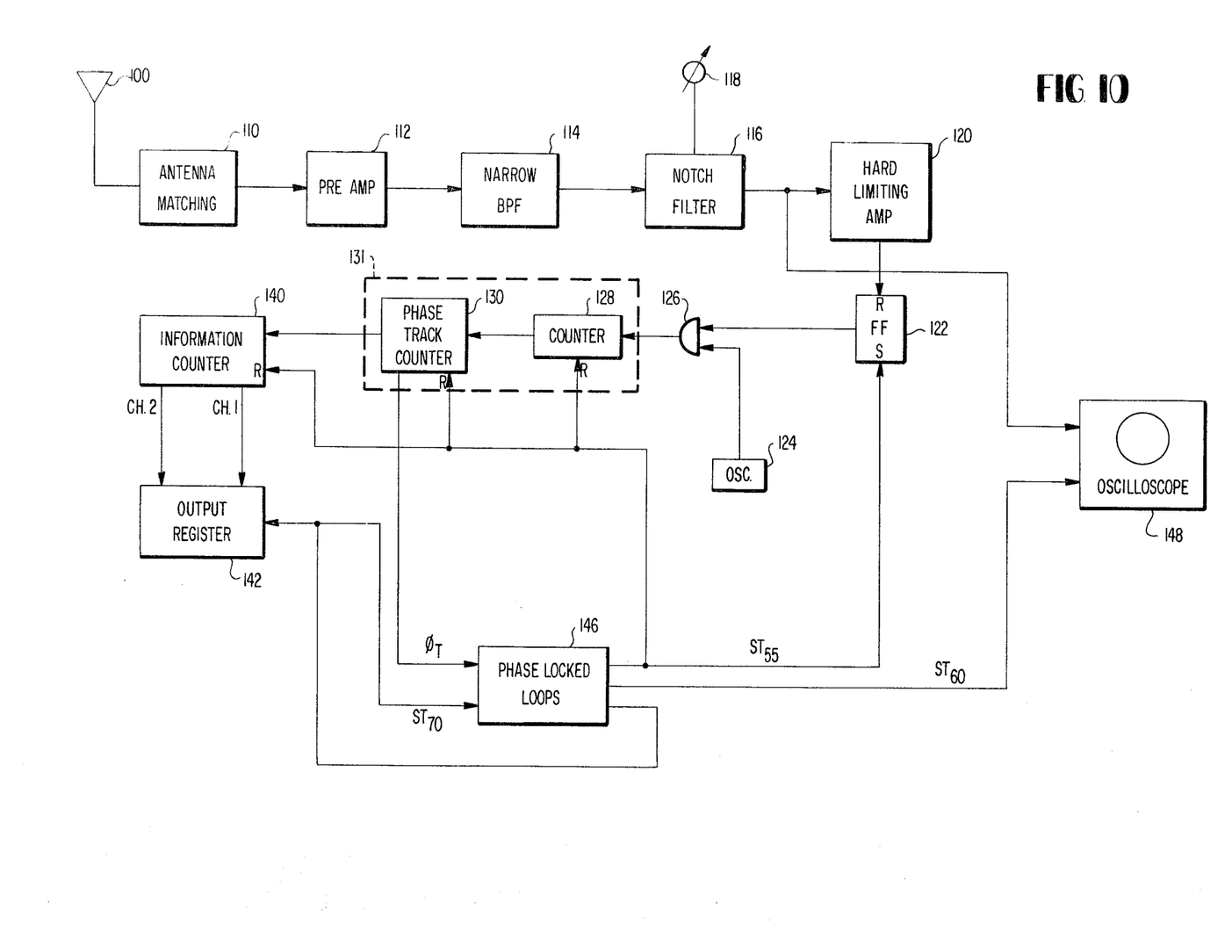
FIG. 10 is a block diagram of a Loran receiver in accordance with a preferred embodiment of the present invention.

A communications receiver capable of detecting the information from the Loran pulses is illustrated in block diagram form in FIG. 10. The communications receiver is similar in many respects to state of the art Loran-C navigation receivers. Consequently, to eliminate unnecessary details of apparatus already known in the prior art, the communications receiver of the present invention will be described as if it were a modified Loran-C navigation receiver, and many of those details which are similar in both receivers will not be described. As a specific example only, reference is made to U.S. patent application of Elmer Lipsey et al., Ser. No. 142,713, now U.S. Pat. No. 3,736,590 issued May 29, 1973, entitled, "Improved Loran-C Receiver," and assigned to the same assignee as the present invention, for a description of a Loran-C navigation receiver.

It will be recalled from the above description that the navigation pulse component of the received composite pulse is notched out or nulled at some point where the composite pulse is sampled. As used herein, the term "sampled" means that the phase of the received pulse at the sample point is compared to a reference phase which is locally generated by a phase locked loop. The reference phase is locked to the NO COMM phase, as will be apparent from the description that follows.

The Loran-C pulse is received by antenna 100 and passed through conventional antenna matching and preamplifier circuits, 110 and 112, to a narrow band pass filter 114 centered at 100 KHz. As a specific example, BPF-114 may have a bandwidth of from 12–18 KHz. The use of a narrow BPF as opposed to a wide band BPF, typically used in a navigation receiver, provides greater noise rejection. In a navigation receiver it is important that the rising portion of the Loran-C pulse envelope be faithfully passed through the BPF since the navigation sample point (30 usec point) is on the rise of the envelope. Consequently, a wide band BPF is necessary. However, since the communications receiver does not sample at the 30 usec point, faithful reproduction of the pulse envelope is not critical, and a narrow BPF may be used for its noise rejection properties.

Figure 5:
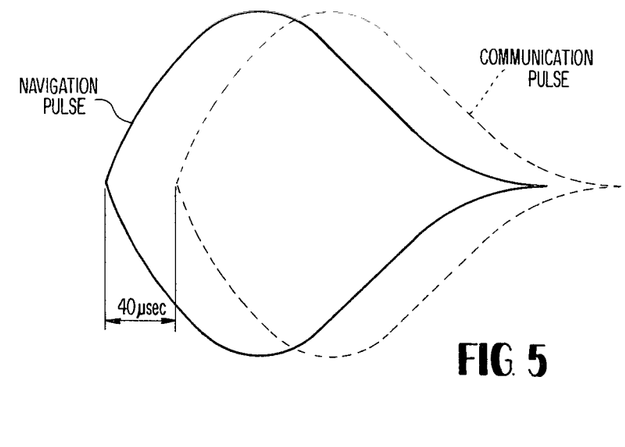
FIG. 5 illustrates the component parts of a composite Loran pulse transmitted and received in accordance with the present invention.
Figure 6:
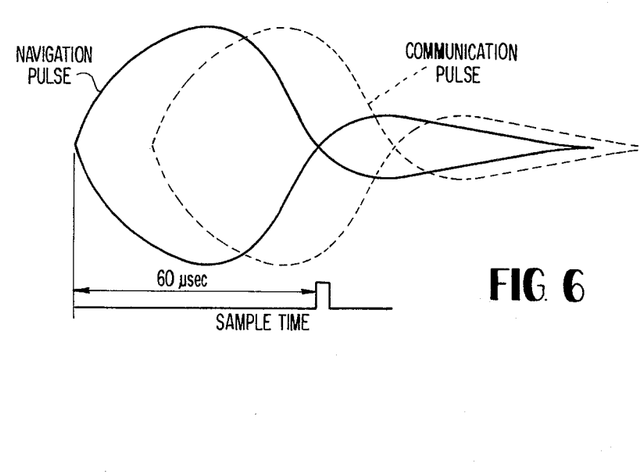
FIG. 6 illustrates the component parts of a composite Loran pulse following nulling by a notch filter.

The BPF output is applied to a notch filter 116 which operates to null the 100 KHz navigation component at the selelcted point, as indicated by the envelope diagrams shown in FIG. 5 (before notching) and 6 (after notching). The principle of notching and notch filters is well known in the art. Furthermore, notch filters are used in state of the art Loran-C navigation receivers. As an example, the cycle identifier described in the above-mentioned Lipsey et al. patent includes a notch filter.

As is well known, to provide notching at a specific point, one must match the notch filter to the navigation pulse envelope. Since BPF-114 alters the pulse envelope the notch filter design has to be matched to the BPF. Furthermore, since various Loran-C transmitters throughout the world provide somewhat differently shaped envelopes for the navigation pulses, it is preferred to have a variable notch filter which can be adjusted by the operator.

Figure 11:
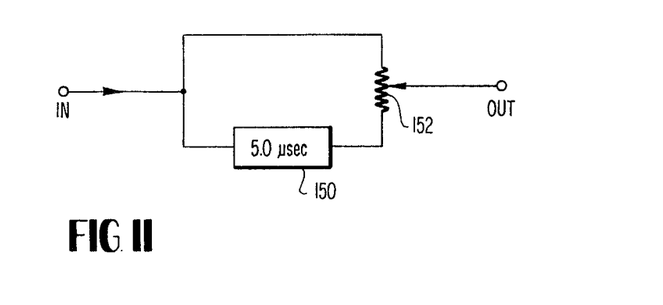
FIG. 11 is a circuit diagram of a variable notch filter which may be used in the receiver of FIG. 10.

As one example, the notch filter may comprise a delay line 150 and variable voltage divider 152 as shown in FIG. 11. The filter operates by adding a slightly delayed waveform to an undelayed waveform. The relative magnitudes of the added components is varied by moving the moveable arm of the potentiometer 152. This has the effect of moving the notch forward and backward in time. One can determine when the notch is at the proper point by using a conventional oscilloscope 148 (FIG. 10) found in most Loran-C navigation receivers.

Every such oscilloscope has a sweep speed for displaying a single pulse. The displayed pulse is, in reality, all pulses from the same transmitter superimposed. Thus, due to modulation, the pulse cycles will be blurred rather than displayed as sharp lines. Since the composite pulse will have the largest modulation index at the point where the navigation pulse component is nulled, one can determine proper notching by varying the notch filter to achieve greatest spreading of the cycle lines at the sixth (or other selected) cycle crossover of the displayed composite pulse. The oscilloscope face may be calibrated to indicate the 60 usec point from the beginning of the pulse. As a preferred technique the oscilloscope additionally displays a trigger pulse $ST_{60}$ which is generated by the phase locked loops and which occurs at the 60 usec point.

Instead of using a filter which operates in the time domain, a filter operating in the frequency domain could be used. Furthermore, the filter could be fixed rather than variable, but in the former case the filter would not be as adaptable for use with all Loran-C transmitters.

The waveform out of filter 116 is applied to a conventional hard limiting amplifier 120 which operates to convert the waveform into a 100 KHz square wave. The square wave will be exactly in-phase with the input waveform applied to hard limiting amplifier 120.

Figure 12:
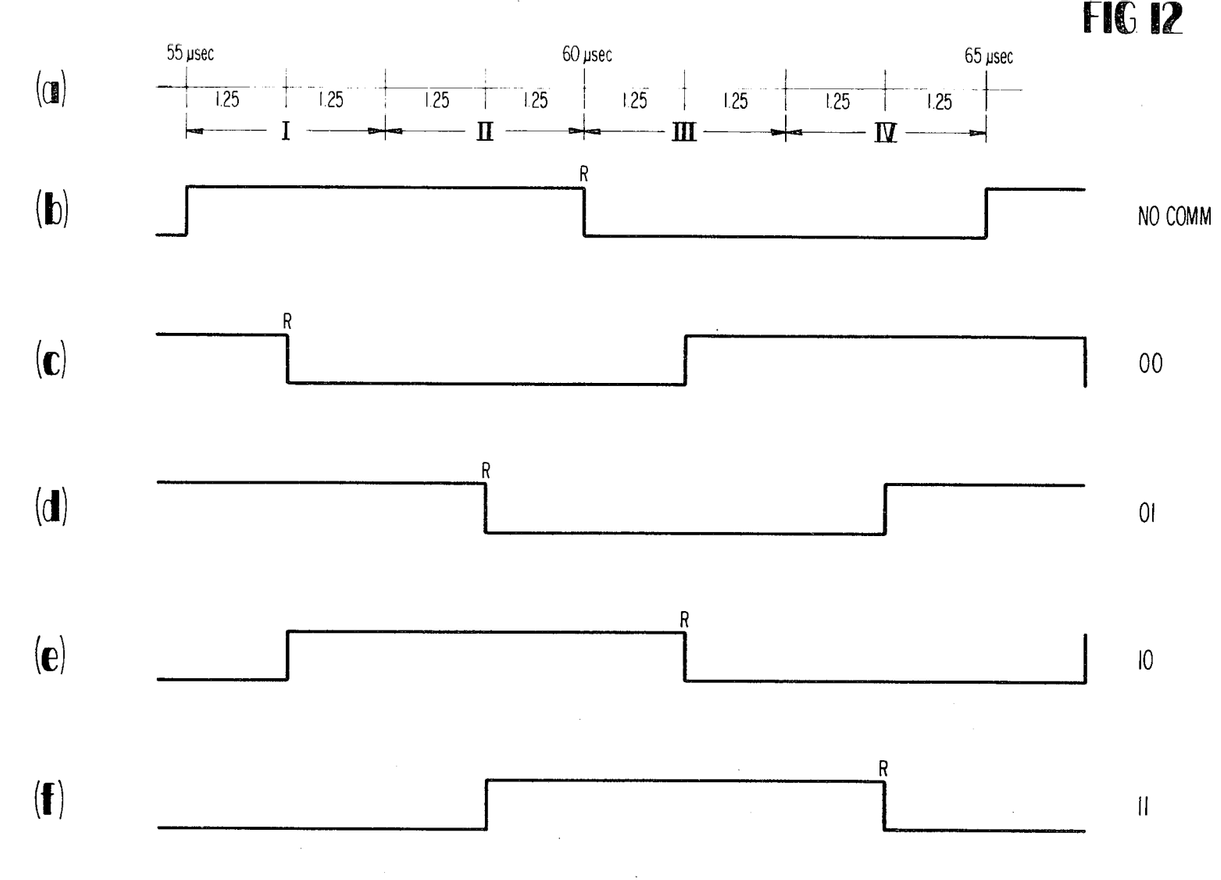
FIG. 12 illustrates waveforms occurring in the receiver of FIG. 10 and is helpful in understanding the operation of certain unique features of the receiver.

Since the latter waveform is sampled and phase detected at the 60 usec point, we need only consider the waveform at that point. Referring to FIG. 12, there is shown a time scale (a) representing time from the pulse starting time, and five waveforms (b)–(f). Waveformm (b) represents the output of the hard limiting amplifier if there is no communications information modulated onto the Loran-c pulse. Thus, (b) represents the reference waveform. Note that the zero crossover occurs at exactly the 60 usec point. Waveforms (c)–(f) represent the four possible phases of the output of amplifier 120.

Waveform (c) represents the waveform when the information modulated onto the Loran-C pulse is 00. This can be seen by referring back to FIG. 3. The 00 information content is represented by a +135° phase shift. In the time domain this corresponds to a time lead of 3.75 usec. Note in waveform (c) the zero crossover (going positive to negative) leads the zero crossover of the reference by 3.75 usec of +135°. (The 10 usec full cycle of the 100 KHz square wave from 55 usec to 65 usec is markedoff on the time scale in increments of 1.25 usec.)

By the same analysis it can be seen that waveform (d) leads the reference by 1.25 usec, corresponding to +45°, and therefore represents information content 01. Waveform (e) lags by 1.25 usec, corresponding to a phase shift of −45°, and represents the information content 10. Waveform (f) lags by 3.75 usec, corresponding to a phase shift of −135°, and represents the information content 11.

The waveforms represent theoretically perfect phase shifts which do not occur in practice. The notch is not perfect and thus all of the navigation pulse component will not be removed. There are other factors which also contribute to a deviation from the theoretical. Therefore, the detection system operates by dividing the 10 usec 100 KHz cycle into four equal quadrants I, II, III and IV. A perfect 00 information content waveform has its negative going crossover R exactly in the middle of quadrant I. For any wave examined, if the negative going crossover R falls in quadrant I, the information content 00 is detected. By similar reasoning, if R is detected in quadrants II, III and Iv the information content is detected as 01, 10 and 11, respectively. Although the quadrants are shown in FIG. 12 on a time scale, they are represented in FIG. 3 on a circular/phasor scale.

In the specific example of FIG. 10, measurement of the quadrant is made as follows. A start pulse, $ST_{55}$, occurring at the 55 usec point of the pulse starts a time measuring circuit. The detection of the negative going crossover R of the hard limited square wave stops the measurement. The amount of time between $ST_{55}$ and R gives the quadrant which in turn provides the information content. An additional feature of the invention is the direct read out logic for deriving a binary representation of the information content. This comprises flip-flop 122, oscillator 124, cycle sector counter 131, and information counter 140. For the two-channel system, the cycle sector counter 131 may be referred to as a cycle quadrant counter. It comprises a plurality of stages of a simple resettable binary up-counter. The number of stages of counter 131 depends upon the pulse rate of the clock pulses provided by oscillator 124. In general, the counter 131 overflows and provides an output pulse every 2.5 usec *while it is counting*. Information counter 140 is a simple binary counter having a number of stages equal to the number of channels of information per Loran-C pulse. For the specific example described, counter 140 is a two-stage binary counter.

The information detection and registration logic operates as follows. At the 55 usec point of each received Loran-C pulse, a trigger impulse $ST_{55}$, generated by phase locked loops to be described later, sets flip-flop 122 thereby opening AND gate 126 to pass clock pulses to the cycle quadrant counter 131. The start impulse $ST_{55}$ also resets counter 131 and 140 to the all zero state. The counter continues counting until the flip-flop is reset by the negative going crossover R of the hard limited square wave. When the flip-flop is reset the state of the information counter 140 represents the information content of the received pulse. This can be understood by considering several examples.

Assume the information content is 00. The communications pulse will be phase shifted $+135°$ and thus the hard limited sixth cycle of the composite pulse, after notching, will be as shown in waveform (c), FIG. 12. Imperfect notching wil cause the waveform to be somewhat shifted from the theoretically perfect position shown, but the crossover R will still fall in the first quadrant. As long as R is in the first quadrant, the flip-flop 122 will be reset before counter 131 has a chance to overflow (it overflows after counting for 2.5 usec). Thus, the state of the two stage binary counter 140 is 00, representing the correct information content.

If R occurs in the second quadrant the counter 131 will count for a duration greater than 2.5 usec and less than 5.0 usec. The counter 131 will overflow once, and the information counter will register the information content 01. If R occurs in the third quadrant the counter 131 will overflow twice and the information counter will register the information content 10. If R is the fourth quadrant, the counter 131 overflows three times and the information counter registers the count 11. At some time after the 65 usec point the state of the information counter may be gated into an output means, shown generally as output register 142. In the example shown, the state of counter 140 is gated into the output register 142 at time 70 usec of each Loran-C pulse by means of a trigger impulse $ST_{70}$ from the phase locked loops.

As one example, if oscillator 124 provides clock pulses at the rate of 100 MHz, and if counter 131 is wired to overflow at the count of 250, the counter 131 will thus provide an overflow pulse at the rate of one per 2.5 usec. For systems other than two-channel systems, the relative parameters of phasors, sectors and overflow times are as follows:

| No. Channels | Phasors | Sectors | 131 Overflow | 140 Stages |
|---|---|---|---|---|
| 1 | 2 | 2 | 5.0 | 1 |
| 2 | 4 | 4 | 2.5 | 2 |
| 3 | 8 | 8 | 1.25 | 3 |
| 4 | 16 | 16 | 0.625 | 4 |
| n | $2^n$ | $2^n$ | $10/_2n$ | n |

It will be appreciated that the larger the number of channels per system the smaller the phase angle between adjacent phasors and the more difficult will be the ability to discriminate between adjacent phasors.

It will be apparent that detection depends upon the start pulse $ST_{55}$ occurring at the proper time. The start pulse $ST_{55}$ is generated by phase locked loops 146 which may be identical to or substantially identical to phase locked loops used in the state of the art Loran-C navigation receivers. As is well known to anyone of ordinary skill in the art, a Loran receiver includes three phase locked loops, one for locking in phase with the receive pulses from the master transmitter, one for locking in phase with the receive pulses from the A transmitter and one for locking in phase with the receive pulses from the B transmitter. The communications receiver also preferably includes three phase locked loops thereby enabling the receiver to detect information modulated onto the pulses of all three transmitters of a Loran-C triad. In actual practice it is contemplated that all three transmitters in a triad will transmit redundant information, however that need not be the case. Furthermore, a less expensive receiver capable of receiving information carried by the pulses from only one of the triad transmitters could be made with only a single phase locked loop.

As one example, the phase locked loops may be the same as in the above-mentioned Lipsey et al. patent with one exception. The exception is that the counter 118 of the synchronizer of FIG. 7 of the patent provides an output at time 55 usec. In the latter patent the symbol $ST_n$ refers to the nth trigger generated, whereas in the present application different symbols are used. Here $ST_n$ designates the trigger occurring at $n$ usec from the start of the pulse. With this difference in symbols kept in mind it will be appreciated that the trigger $ST_8$ in the prior patent occurs at the 55 usec point of each pulse and the trigger $ST_{11}$ occurs at the 70 usec point of each pulse. Those two triggers could be used herein as triggers $ST_{55}$ and $ST_{70}$. However, it should be noted that this is not the preferred system for phase tracking. If the phase loop is used as described, it tracks the third cycle of the composite pulse. One problem with this is that the narrow BPF filter 114 tends to reduce the amplitude of the third cycle thus making it less attractive for tracking. Secondly, and more importantly, the third cycle represents the NAV PULSE alone. Thus far, it has been assumed that the NAV PULSE and the NO COMM phasors are both at the zero or reference phase. However, in the receiver the reference phase may be slightly different than the NAV PULSE phase. It is believed that better results are obtained if each phase locked loop tracks an imaginary reference phase by detecting phase lag and phase lead in response to each detected phasor.

An understanding of the above will hopefully be clearer by considering how the preferred phase tracking operates conceptually. The loop generates a trigger $ST_{55}$ and the assumption is made that the crossover R occurs in the first quadrant. The object is to properly align $ST_{55}$ with the beginning of waveform (b) of FIG. 12 even though waveform (b) the (imaginary reference) may not occur in fact and even though waveform (b) is not per se used in the tracking loop. The system assumes that R occurs at the exact theoretical time of 1.25 usec after the start pulse. If it does not, the system operates to shift the start pulse. Thus, if R occurs prior to time 1.25 usec that means that $ST_{55}$ is generated too late. This is detected as a phase lag. If R occurs after 1.25 usec (still in the first quadrant) this means that $ST_{55}$ was generated too soon. This is detected as a phase lead. The same detections are made in quadrants II, III and IV. The lag, lead detections are fed to the phase locked loops to shift the start pulse to bring it in line with the start time of the imaginary reference cycle.

Although the concept seems complicated the circuitry for carrying out the phase tracking of the imaginary reference is surprising in its simplicity. In the preferred embodiment the cycle sector counter is dividied into two parts, a binary counter 128 and a phase track counter 130. The phase track counter is simply a single stage binary counter sometimes referred to as a ÷2 counter or a flip-flop. It will be apparent that since cycle sector counter 131 must recycle or provide an output pulse once each sector (corresponding to the duration of a sector), that the binary counter 128 must provide an output pulse once each half sector. Thus, for the two-channel example wherein there are four sectors (quadrants) of each 10 usec cycle, the overall sector counter recycles every 2.5 usec (10 usec/4). The binary counter 128 therefore must recycle every 1.25 usec (½ × 10/4). The counter 128 may thus be referred to as the half sector counter. Referring back to FIG. 12 it can now be seen that the phase track counter contains a binary bit (1 or 0), at the end of the counting cycle, which designates whether $ST_{55}$ leads or lags the "imaginary reference" start-of-cycle.

As one example assume the information content is 00 and R occurs at time 1.20 from the start trigger $ST_{55}$. At the end of counting the information counter registers 00, and the phase track counter registers $0_t$, indicating a phase lag for $ST_{55}$. The phase counter state is applied to the phase locked loops to shift the start trigger $ST_{55}$ forward in time to compensate for the lag.

As a second example assume that crossover R occurs 1.30 usec after $ST_{55}$. AT time 1.25 usec, half sector counter 128 provides an output to phase track counter 130 thereby changing the latter from state 0 (the reset state) to state 1. At time 1.30 usec the counting stops. The information counter still registers 00 and the phase tracker registers 1, indicating a phase lead for $ST_{55}$.

It can thus be seen that phase track counter 130 registers 0 during the first half of each sector and 1 during the second half. At the end of every counting cycle, the state of the phase track counter thus indicates the phase lead or lag of the start trigger. This latter indication can be applied to any conventional phase locked loop used in a conventional Loran-C navigation receiver for controlling the direction of shifting of the output pulses $ST_{55}$ and $ST_{70}$. As a specific example the phase locked loop mentioned above as being a slightly modified form of that described in the abovementioned patent could be used. The only change is that the phase track information, $\phi_T$, from the phase track counter 130, is used to steer the input of the phase locked loops. Specifically, referring to the abovementioned patent, $\phi_T$, substitutes for the STR input of the phase locked loops. Also, since $\phi_T$, unlike STR in the navigation receiver, is constant after the end of the counting cycle, it is unnecessary to apply any one particular trigger pulse input to the phase locked loops. Thus, any trigger occurring after the end of the counting cycle could be substituted for $ST_3$ of the above patent application.

As a specific example $ST_{70}$ may be used since the counting cycle will always be over by the time $ST_{70}$ arrives. Furthermore, as pointed out above, and as is known from the prior patent, the phase locked loop generates a plurality of triggers $ST_n$ separated by 5 usec. The one picked off and applied as the start trigger is designated hererin as $ST_{55}$. If it does not initially occur at a time corresponding to the 55 usec point of the received pulse it will be brought into the proper time sequence by the tracking properties of counter 130 and the phase locked loops 146. The trigger which is the third after the start trigger is designated $ST_{70}$ and is used in the manner described above. The trigger immediately following the start trigger, $ST_{55}$, is designated $ST_{60}$. This trigger may be displayed on the oscilloscope 148 to indicate the sixth cycle of the simultaneously displayed "notched" composite pulse.

What is claimed is:

1. A system for communicating additional information via a Loran pulsed navigation system, said pulsed navigation system being of the type which periodically transmits navigation pulses having a point thereon, time separated from the pulse beginning, which is used for accurate navigation position detection, said system comprising;
    a. modulation means responsive to said additional information for phase shifting a portion of the carrier frequency of said pulse an amount dependent upon the content of said information, said portion excluding said navigation point, and
    b. means for transmitting said modulated pulse.

2. A system as claimed in claim 1 further comprising receiver means adapted to receive said transmitted pulse and measure said phase shift at a second point on said pulse, said second point on said pulse being within said modulated portion.

3. A system as claimed in claim 1 wherein said modulation means comprises multiphase means responsive to n binary bits of information for phase shifting said portion one of $2^n$ possible angles depending upon the total value of said $n$ bits of information.

4. A system as claimed in claim 1 further comprising receiver means for receiving said pulses and detecting said information, said receiver means comprising,
    a. notch filter means for nulling an unmodulated navigation pulse at a time point subsequent to said navigation point,
    b. means for applying said modulated pulse to said notch filter means, and
    c. means for measuring the phase of the output pulse from said notch filter means at said subsequent time point.

5. A system as claimed in claim 4 wherein said modulation means comprises multiphase means responsive to n bits of information for phase shifting said portion of one of $2^n$ possible angles depending upon the total value of said $n$ bits of information.

6. A system as claimed in claim 5 wherein said phase measuring means comprises,
    a. a source of clock pulses,
    b. counter means having a plurality of stages, and
    c. means for applying said clock pulses to said counter means between the occurrence of a time reference start trigger and said subsequent time point of the pulse output from said notch filter.

7. A system as claimed in claim 6 wherein said counter means comprises,
   a. cycle sector counter means responsive to said clock pulses for providing output trigger pulses at the rate of $2^n$ per cycle of said transmitted pulse carrier wave, and
   b. information counter means having n stages and responsive to the output trigger pulses for counting said output trigger pulses and registering the information content of said n bits of information.

8. A system as claimed in claim 7 wherein said cycle sector counter means comprises,
   a. cycle half sector counter means responsive to said clock pulses for providing output pulses at the rate of $2^{n+1}$ per cycle of said transmitted pulse carrier wave, and
   b. phase track counter means having one stage and adapted to count said last mentioned output trigger pulses and provide one output trigger pulse to said information counter for every two output trigger pulses from said cycle half sector counter, whereby the state of said phase track counter at the termination of counter represents the phase error of said time reference start trigger.

9. A system as claimed in claim 8 wherein said receiver means further comprises at least one phase locked loop responsive to the state of said phase track counter means for phase locking said time reference start trigger.

10. A system as claimed in claim 9 wherein said transmitted pulse is a composite pulse consisting of said navigation pulse and a phase modulated communications pulse, said communications pulse having the same carrier frequency as said navigation pulse, being delayed by an amount greater than the navigation time point, and having a phase shift, with respect to the phase of said navigation pulse carrier frequency, which is dependent upon said $n$ information bits.

11. A system as claimed in claim 1 wherein said Loran pulsed navigation system is the type which comprises means for generating a block of said carrier frequency and non-linear transmitter circuitry adapted to form a block of carrier frequency into said Loran navigation pulses, wherein the modulation means comprises,
   a. a summation means having two input terminals and an output terminal, one of said input terminals connected to receive said block of carrier frequency, and said output terminal connected to apply the sum of the inputs to said non-linear transmitter circuitry, and
   b. means responsive to said additional information, and having an input connected to receive said block of carrier frequency and an output connected to the second input terminal of said summation means, for imparting to said block of carrier frequency a delay equal to an integral number of cycles of said carrier plus a phase shift equal to a portion of a cycle in dependence upon the content of said information.

12. A system as claimed in claim 11 wherein said means for imparting comprises,
   a. a multi-tapped delay line having at least $2^n$ output tap lines, said $2^n$ output tap lines tapping said delay line means at $2^n$ different delay times corresponding to $2^n$ equal parts of a cycle of said carrier frequency, and
   b. decoder multiplexer means responsive to n binary bits of said information for selectively connecting one of said output tap lines to the output terminal of said imparting means in dependence upon the content of said n binary bits.

13. A system as claimed in claim 10 wherein said Loran pulsed navigation system is the type which comprises means for generating a block of said carrier frequency and non-linear transmitter circuitry adapted to form a block of carrier frequency into said Loran navigation pulse, wherein the modulation means comprises,
   a. a summation means having two input terminals and an output terminal, one of said input terminals connected to receive said block of carrier frequency, and said output terminal connected to apply the sum of the inputs to said non-linear transmitter circuitry, and
   b. means responsive to said additional information, and having an input connected to receive said block of carrier frequency and an output connected to the second input terminal of said summation means, for imparting to said block of carrier frequency a delay equal to an integral number of cycles of said carrier plus a phase shift equal to a portion of a cycle in dependence upon the content of said information.

14. A system as claimed in claim 13 wherein said means for imparting comprises,
   a. a multi-tapped delay line having at least $2^n$ output tap lines, said $2^n$ output tap lines tapping said delay line means at $2^n$ different delay times corresponding to $2^n$ equal parts of a cycle of said carrier frequency, and
   b. decoder multiplexer means responsive to n binary bits of said information for selectively connecting one of said output tap lines to the output terminal of said imparting means in dependence upon the content of said n binary bits.

15. A system as claimed in claim 1 wherein said Loran pulsed navigation system is the type which comprises impulse generating means for periodically generating impulses, pulse forming network means responsive to an impulse applied thereto for generating a Loran navigation pulse having a carrier frequency and an envelope, said modulation means comprising,
   a. summation means having one output connected to said pulse forming network and two inputs, one of said inputs connected to receive said impulses, and
   b. means, connected between said impulse generating means and the second input of said summation means, for delaying impulses applied thereto an amount of time equal to a fixed delay plus a variable delay, where said fixed delay equals the duration of an integral number of cycles of said carrier and is greater than the separation of said navigation time point from the front end of a navigation pulse, and where said variable delay is either positive or negative and has a duration dependent upon the content of said information.

16. A system as claimed in claim 10 wherein said Loran pulsed navigation system is the type which comprises impulse generating means for periodically generating impulses, pulse forming network means responsive to an impulse applied thereto for generating a Loran navigation pulse having a carrier frequency and an envelope, said modulation means comprising,
   a. summation means having one output connected to said pulse forming network and two inputs, one of said inputs connected to receive said impulses, and b. means, connected between said impulse generating means and the second input of said summation means, for delaying impulses applied thereto an amount of time equal to a fixed delay plus a variable delay, where said fixed delay equals the duration of an integral number of cycles of said carrier and is greater in duration than the separation of said navigation time point from the front end of a navigation pulse, and where said variable delay is either positive or negative and has a duration dependent upon the content of said information.

17. A pulsed Loran transmitting station of the type which forms a Loran pulse of fixed carrier frequency in responsive to a signal generated in said transmitting station at the pulse transmit time, said Loran transmitting station comprising means responsive to said signal for forming a Loran pulse, the improvement comprising, a. means responsive to information to be modulated onto a Loran pulse for revising said signal in dependence upon said information, and b. means for applying said revised signal to said means for forming a Loran pulse, whereby said pulse thus formed has a first portion thereof which is unmodulated and a second portion thereof which is modulated, said first portion including the reference point on which Loran navigation receiver s determine precise positioning information.

18. A pulsed Loran transmitting station as claimed in claim 17 wherein said first portion which is unmodulated comprises at least the first three cycles of the carrier frequency of said Loran pulse, and wherein said second portion comprises the remainder of said Loran pulse.

19. A pulsed Loran transmitting station as claimed in claim 18 wherein said means for revising comprises, a. means for delaying said signal an amount equal to the duration of said first portion and phase shifting said thus delayed signal an amount dependent upon the content of said information, said amount being less than a cycle of said carrier frequency, b. means for combining the signal output of said means for delaying and phase shifting with the said signal input of said means for delaying and phase shifting to form said revised signal.

20. A pulsed Loran transmitting station as claimed in claim 19 wherein said means for delaying and phase shifting comprises, a. a delay means having one input terminal adapted to receive said signal and at least $2^n$ output taps, said $2^n$ taps being positioned to provide $2^n$ respective delay times between said input and said $2^n$ output taps, said output taps being time separated by $\tau/2^n$, where $\tau$ is the period of one cycle of said carrier frequency, and wherein half of said delay times are less than the delay time equal to a predetermined integral number of cycles of said carrier frequency, and the other half of said delay times are greater than the delay time equal to said predetermined integral number of cycles of said carrier.

b. an output terminal for connecting a signal applied thereto to said means for combining, and c. decode and multiplexing means responsive to n binary bits of said information for selectively connecting one of said $2^n$ output taps to said output terminal in dependence upon the content of said n binary bits of information.

21. A pulsed Loran transmitting station as claimed in claim 20 wherein said signal is a block of said carrier frequency and said means for forming a Loran pulse is a non-linear transmitter circuit.

22. A pulsed Loran transmitting station as claimed in claim 20 wherein said signal is an impulse and said means for forming is an impulse responsive pulse forming network.

23. A Loran communications receiver adapted to detect information from a Loran pulse having the following characteristics;

said Loran pulse being a composite of a navigation pulse, having a carrier $L_1$, and a communications pulse having a carrier $L_1$ and a phase $\phi_c$ with respect to said navigation pulse carrier, said phase $\phi_c$ being dependent upon n bits of information, and said communications pulse starting after said navigation pulse, said communications receiver comprising, a. first means for receiving said Loran pulse, b. notch filter means for substantially nulling said navigation pulse component from said Loran pulse at a particular reference point of said Loran pulse, and c. means for measuring the phase shift of the output of said notch filter at said reference point.

24. A Loran communications receiver as claimed in claim 23 wherein said means for measuring the phase shift comprises, a. hard limiting amplifier means for squaring the carrier of the pulse output from said notch filter means, b. means responsive to a locally generated start trigger and the next occurring crossover of the output of said hard limiting amplifier for generating a gating pulse, c. cycle sector means responsive to said gating pulse for generating, during said gating pulse, output cycle sector pulses at the rate of $(2^n) \cdot (L_1)$, d. n stage output binary counter means for accumulating said output cycle sector pulses, the state of said counter after the termination of said gating pulse representing the content of said n bits of information, and e. at least one phase locked loop for generating said locally generated start trigger.

25. A Loran communications receiver as claimed in claim 24 wherein said cycle sector means comprises, a. cycle half sector means responsive to said gating pulse for generating, during said gating pulse, output cycle half sector pulses at the rate of $(2) \cdot (2^n) \cdot (L_1)$, b. a phase tracking divide by two counter means responsive to said output cycle half sector pulses for generating said output cycle sector pulses, the state of said phase tracking divide by two counter after the termination of said gating pulse representing the phase lag or lead of said locally generated start trigger, and c. means for connecting said phase tracking divide by two counter to said at least one phase locked loop to cause said phase locked loop to shift said trigger in a direction depending upon the state of said phase tracking divide by two counter.

26. A Loran communications receiver as claimed in claim 25 wherein said means for generating a gating pulse comprises a bistable circuit means having two input terminals connected, respectively, to receive said start trigger and said hard limited amplifier output, whereby said bistable circuit is switched to a first state providing said output gating pulse in response to said start trigger and is switched to a second state, terminating said gating pulse, in response to a negative going zero crossover in the hard limited amplifier output waveform.

* * * * *